J. BINGHAM.
ROLLER BEARING CAGE.
APPLICATION FILED SEPT. 28, 1917.
1,387,829.
Patented Aug. 16, 1921.
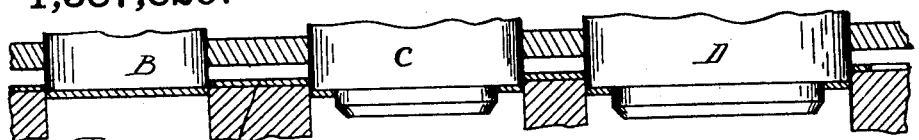
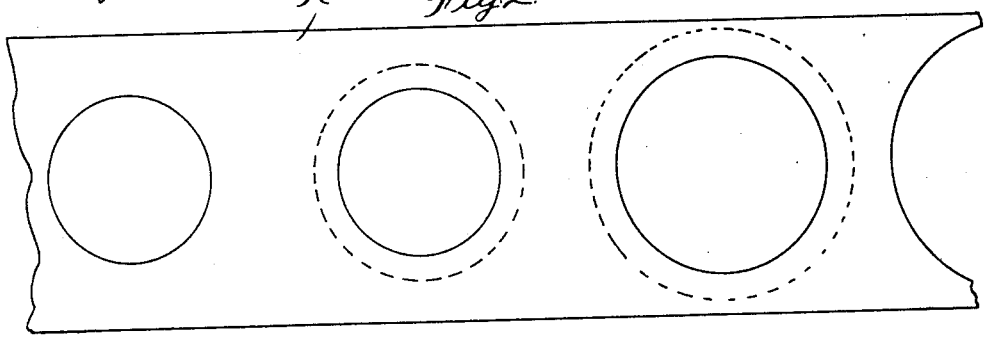
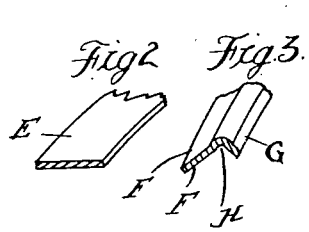
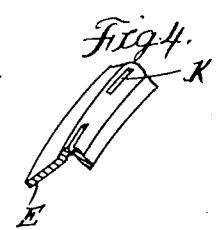
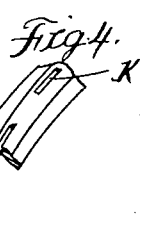
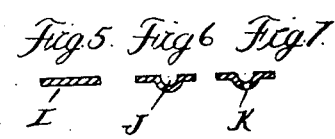
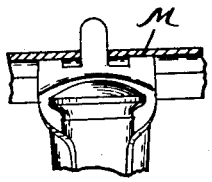
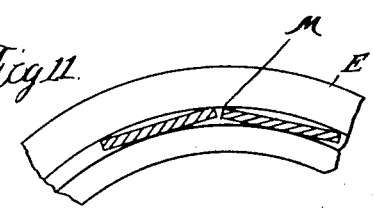
Inventor
Jeremiah Bingham
By Whittemore Hulbert & Whittemore
Attorneys

UNITED STATES PATENT OFFICE.

JEREMIAH BINGHAM, OF TOLEDO, OHIO, ASSIGNOR TO THE BOCK BEARING COMPANY, OF TOLEDO, OHIO, A CORPORATION OF OHIO.

ROLLER-BEARING CAGE.

1,387,829.                Specification of Letters Patent.    Patented Aug. 16, 1921.

Application filed September 28, 1917. Serial No. 193,716.

*To all whom it may concern:*

Be it known that I, JEREMIAH BINGHAM, a citizen of the United States of America, residing at Toledo, in the county of Lucas and State of Ohio, have invented certain new and useful Improvements in Roller-Bearing Cages, of which the following is a specification, reference being had therein to the accompanying drawings.

The invention relates to the manufacture of roller bearings of that type in which the rolls are individually housed in casings or cells, and these casings or cells are then assembled in predetermined relation to each other. The present invention has reference to the construction and method of forming the rings or connectors to which the individual cells are joined and comprises the novel features as hereinafter set forth.

In the drawings:

Figure 1 is a plan view of the sheet-metal blank from which the connectors are formed;

Figs. 2, 3 and 4 are sectional perspective views showing the successive steps in the formation of the ring for the large end of the bearing;

Figs. 5, 6 and 7 are cross-sections, showing the successive steps in forming the ring for the small end of the bearing;

Fig. 8 is a cross-section showing the rings in assembled relation to each other, with one of the individual roll cells or housings shown in dotted lines;

Fig. 9 is a diagrammatic section showing the manner of blanking the rings;

Fig. 10 is a section on line 10—10 of Fig. 8, showing a roll cell or housing in elevation: Fig. 11 is a section on line 11—11 of Fig. 8.

The rolls which enter into the construction of the roller bearings are of the type having tapering or conical portions for receiving the radial thrust, and enlarged spherical end portions for receiving the end thrust. These rolls when housed and assembled in relation to each other form a conical structure which, to retain its shape and proper alinement of the rolls, requires rigid connection at opposite ends. I have therefore devised a construction of connector rings to which the individual cells may be readily attached and held in a predetermined relation, and I have also devised a method for economically manufacturing these rings as follows:

In designing the roller bearing the tapering form necessitates connector rings of different size on the opposite ends thereof. I have found that by suitably proportioning the parts the outer diameter of the smaller ring may be maintained within the inner diameter of the larger ring, so that both may be cut from a single blank. As shown in Figs. 1 and 9, A is a sheet-metal strip of suitable gage and width, which is fed successively to a series of punches or blanking dies B, C and D arranged in predetermined relation to each other. The punch B is of a diameter corresponding to that of the inner edge of the smaller ring, the punch C is of a diameter corresponding to the outer edge of the smaller ring and the inner edge of the larger ring, and the punch D is of a diameter corresponding to the outer edge of the larger ring. Thus when the strip is fed successively to the different punches it will be blanked, as shown in Fig. 1, and as all of the punches may be operated simultaneously, each operation will result in the blanking of the two rings for the opposite ends of the bearing.

It is essential to provide means for firmly securing the individual roll housings to these rings and also to impart sufficient rigidity to the structure to hold the rolls in alinement. This is accomplished by pressing the rings into channel cross-section, as indicated in Figs. 2 to 7. The large ring E is pressed into a section shown in Fig. 3, having the oblique flange F on its outer side and an oppositely-angling flange G on its inner side, between which there is formed a comparatively narrow groove H. The small ring I has the opposite edges thereof in substantially the same plane but the central portion is struck out to form a narrow groove J. The rings E and I are then punched to form slits or apertures K at predetermined intervals in the grooved portions H and J, said slits being adapted to receive tongues on the opposite ends of the individual roll housings.

The rings formed in the manner above described will constitute strongly braced connectors for the individual roll housing, which latter may be assembled therewith, as indicated in dotted lines in Fig. 8, the tongues L being inserted through the slits K and then turned over. It will be noted that the oblique flange F lies adjacent to and abuts against the ends of the individual roll housings, and its oblique form also stiffens and braces the whole structure. It will also be observed that the grooves H and J will form three point bearings for flanges M at the ends of the roll housings, which hold the latter from turning or twisting in relation to the rings.

What I claim as my invention is:

1. In a roller bearing cage, coöperating connector rings each comprising a pressed sheet metal annulus having a bearing portion and a relatively narrow grooved portion, said grooved portion having slits or apertures predeterminedly spaced therein, and means engaging in said slits or apertures for connecting said rings to each other, said means bearing at spaced points upon the walls of said grooved portions.

2. In a roller bearing cage, coöperating connector rings, the outer diameter of the smaller ring being no greater than the inner diameter of the larger ring, each of said rings having a bearing portion and an annular grooved portion, said grooved portion being provided with predeterminedly spaced slits or apertures therein, and means engaging in said slits or apertures for connecting said rings to each other.

In testimony whereof I affix my signature.

JEREMIAH BINGHAM.